US005443553A

United States Patent [19]

Shiga et al.

[11] Patent Number: 5,443,553

[45] Date of Patent: Aug. 22, 1995

[54] STARTER

[75] Inventors: Tsutomu Shiga, Nukata; Nobuyuki Hayashi, Nagoya; Masanori Ohmi, Anjyo; Masami Niimi, Handa, all of Japan

[73] Assignee: Nippondenso Co., Ltd., Kariya, Japan

[21] Appl. No.: 357,242

[22] Filed: Dec. 13, 1994

[30] Foreign Application Priority Data

Dec. 16, 1993 [JP] Japan .................................. 5-316729
Oct. 6, 1994 [JP] Japan .................................. 6-242910

[51] Int. Cl.[6] .......................... F02N 15/06; F16H 1/32

[52] U.S. Cl. .......................................... 74/7 R; 74/7 A; 74/7 E; 475/318

[58] Field of Search ......................... 74/7 R, 7 A, 7 E; 290/48; 475/318

[56] References Cited

U.S. PATENT DOCUMENTS 4,104,926 8/1978 Wilson .............................. 74/7 R X
4,931,663 6/1990 Morishita et al. ................ 74/7 A X
4,958,530 9/1990 Jaseck et al. ......................... 74/7 A
5,111,093 5/1992 Tanaka ............................ 74/7 A X

OTHER PUBLICATIONS

Journal of Nippondenso Technical Disclosure, Nos. 54-052 and 54-053 Jul. 15, 1987.

*Primary Examiner*—Allan D. Herrmann
*Attorney, Agent, or Firm*—Cushman Darby & Cushman

[57] ABSTRACT

A starter includes a housing having a water barrier wall, a drive shaft disposed in the housing, and pinion gear having a flange portion. The water barrier wall comes into contact with the flange portion when the starter is in operation. The pinion gear is adapted to engage with a ring gear of an engine, which the starter starts. The pinion gear contacts the drive shaft through a sliding portion. The structure of the starter prevents water, dust, dirt and other contaminants from leaking into the housing via a window in the housing. Thus, the function and operability of the starter is improved.

14 Claims, 20 Drawing Sheets

STARTER

CROSS REFERENCE TO RELATED APPLICATIONS

This application is based upon and claims priority from Japanese Patent Applications 5-316729 filed Dec. 16, 1993 and 6-242910 filed Oct. 6, 1994, the contents of which are hereby incorporated herein by reference.

BACKGROUND OF THE INVENTION

1. Field of the Invention

The present invention relates to a starter for starting an engine. More particularly, the present invention relates to the a seal structure for housing window portions of the starter.

2. Related Art

The conventional starter used for starting engines included a housing having a gear chamber interlocked with external parts via a window, a drive shaft stored in the gear chamber and of which one end was rotatably supported by the housing end, and a pinion gear freely fit with the drive shaft in the gear chamber, with relative rotation and axial sliding allowed therebetween, and which engaged with a ring gear through the window during advancing.

In the above type of conventional starter, dirty water, mud and dust entered the gear chamber through the window particularly because of the rotating ring gear, and contaminants inside of the gear chamber.

Journal of Nippondenso Technical Disclosure Nos. 54-052 and 54-053 teach to resolve this problem. According to these documents, the housing window portion is shielded with a window shutter interlocked with the advancement and retraction of the pinion, so as to prevent dirty water, mud and dust, etc., from entering the gear chamber when the pinion is still or not in movement.

However, in these documents, the pinion end protrudes from the housing window when the pinion retracts. The water from the outer circumference of the pinion brought up onto the ring gear concentrates on the teeth roots of the pinion gear. This water runs along the teeth roots, and infiltrates the housing. Furthermore, these documents do not contemplate a dust-proof structure, as is desirable in a practical use.

Portions that support the output shaft with the housing end have a structure that fixes the bearings with the open holes on the housing. Foreign materials enter into these open holes.

SUMMARY OF THE INVENTION

In view of the above problems, the present invention has as a primary object the provision of a starter that can securely prevent water and dust from entering the housing, and thus contaminating the interior thereof.

In order to accomplish this objective, the present invention includes an output shaft that holds a pinion engaged with an engine ring gear axially so that the shaft can slide freely, a window portion that rotatably supports one end of the output shaft, and that advances the pinion to engage with the ring gear, a housing comprising a projection portion that projects to the end of the pinion when the pinion retracts, and a window shutter comprising a shielding portion that covers the housing window portion, and that moves the shielding portion according to the movement of the pinion toward the ring gear side.

With the starter constructed as just described, the window shutter opens the housing opening when the pinion gear advances to allow the pinion gear and ring gear to engage, and closes the housing opening when the pinion gear retracts. At the same time, the pinion is covered to the end by the housing projection portion so the water brought up onto the ring gear does not contact the outer circumference of the pinion. This prevents the direct water infiltration at the inlet lessens, the entering of water into the housing, and greatly improves the durability of the sliding portion between the output shaft and the pinion.

BRIEF DESCRIPTION OF THE DRAWINGS

These and other object of the present invention as well as other features and characteristics as well as the function of the related part will become clear to a person of ordinary skill in the art to which the present invention pertains from a study of the following detailed description, the appended claims, and drawings all of which form a part of this application. In the drawings:

DETAILED DESCRIPTION OF PRESENTLY PREFERRED EXEMPLARY EMBODIMENTS

Figure 1:
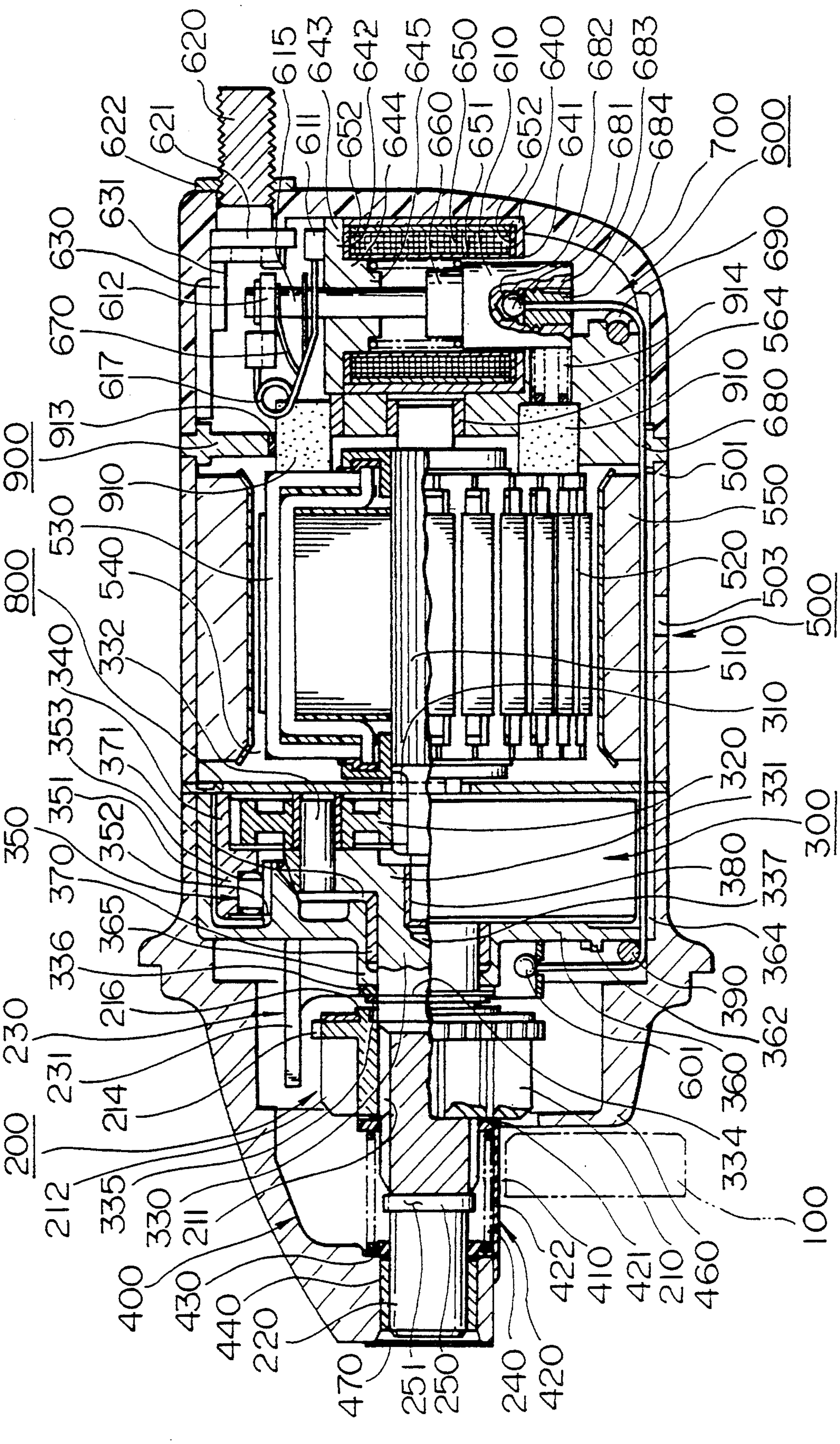
FIG. 1 is a cress-sectional view illustrating the side of a starter according to the first embodiment of the present invention.

The first embodiment of a starter according to the present invention will be described with reference to FIGS. 1 through 16.

The starter is largely divided into housing 400 in which pinion 200 that engages with ring gears 100 and epicycle or reduction gear mechanism 300 are enclosed and installed on an engine (not shown). Motor 500 is in housing 400, and end frame 700 contains magnet switch 600. Housing 400 and motor 500 are separated by motor partition 800 within the starter, and motor 500 and end frame 700 are separated by brush holding member 900.

Figure 2A:
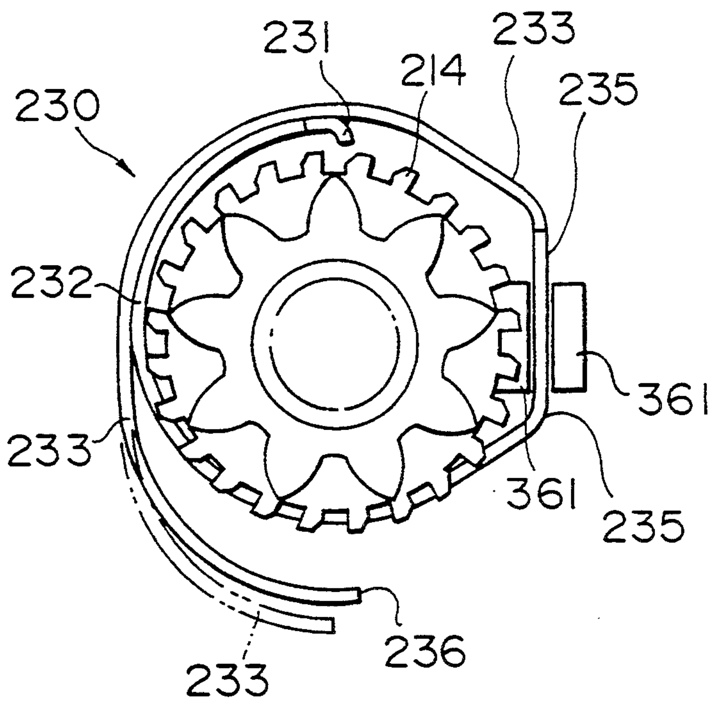
FIGS. 2A and 2B are a front view and partial cross-sectional view illustrating the state when a pinion rotating restriction members are assembled onto a pinion portion.
Figure 2B:
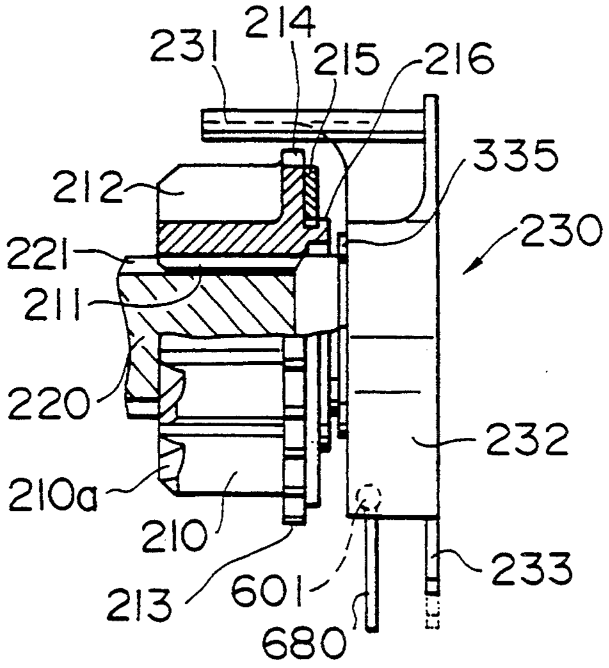

As shown in FIGS. 1, 2A and 2B, pinion gear 210 that engages with the engine's ring gear 100 is formed on pinion 200. Pinion helical spline 211 that fits with helical spline 221 formed on output shaft 220 is formed on the inner circumference of pinion gear 210.

Flange 213 with an outer diameter dimension larger than pinion gear 210 is formed in a ring-shape on the ring gear side opposite of pinion gear 210. Notches 214 of which the number is larger than that of pinion gear 210 outer teeth are formed on the outer circumference of flange 213. Notches 214 fit with the restriction claw 231 on later-described pinion rotation restriction member 230. Washer 215 can freely rotate and does not fall out in the axial direction at the rear of flange 213 as round ring portion 216 formed on the rear end of pinion gear 210 is bent toward the outer circumference.

Pinion gear 210 is constantly biased toward the rear of output shaft 220 by return spring 240 composed of compressed coil spring. Return spring 240 does not directly energize pinion gear 210, but in this embodiment biases pinion gear 210 via ring body 21 on shutter 420 (described below) that opens and closes opening portion 410 of housing 400.

Restriction claw 231 that forms the restriction portion, and which extends in the axial direction to fit with multiple notches 214 formed on flange 213 of pinion gear 210, are formed on one end of rotation restriction portion 232. Restriction claw 231 fit with notches 214 on pinion gear 210. Furthermore to improve the rigidity of restriction claw 231, claw 231 are formed to extend in the axial direction, and have a cross-sectional L-shape that is bent toward the inner radial direction. The claw 231 are bar-shaped.

The operation of the pinion rotation restriction member 230 is explained here. String-shaped member 680 is a conveyance means to convey operation of magnet switch 600 to restriction claw 231. Rotation restriction portion 232 is pulled downward according to operation of magnet switch 600 so that the restriction claw 231 fits with notches 214 on flange 213 of pinion gear 210. At that time, one end 236 of the return spring portion 233 contacts restriction shelf 362 to restrict the position, and return spring portion 233 slackens. Restriction claw 231 is fit with notches 214 of pinion gear 210, so when rotation of pinion gear 210 is made by armature shaft 510 of motor 500 and epicycle mechanism 300, pinion gear 210 advances along the helical spline 221 of output shaft 220. When pinion gear 210 contacts the ring gear 100, and the advance of pinion gear 210 is prevented, pinion rotation restriction member 230 slackens due to the further rotational force of output shaft 210. Pinion gear 210 will rotate slightly and engage with ring gear 100. When pinion gear 210 advances, restriction claw 231 is disengaged from notches 214, and restriction claw 231 drops behind the rear of flange 213 of pinion gear 210. The front end of restriction claw 231 contacts the rear surface of washer 215 and retraction of pinion gear 210 is prevented by the rotation of engine's ring gear 100.

Pinion fitting ring 250 is fixed on the cross-sectional rectangular ring groove formed on the periphery of the output shaft 220. Pinion fitting ring 250 is formed by round-machining cross-sectional rectangular steel material. Approximately S-shaped notches 251 (example of fitting means) are formed on both ends. One convex notch fits with the other concave notch, and one convex notch fits with the other concave notch.

Epicycle gear mechanism 300 shown in FIG. 1 is a speed reduction means that reduces the rotation speed relative to the motor 500 (explained later) and increases motor 500 output torque. Epicycle gear mechanism 300 is composed of sun gear 310 formed on the front outer circumference of motor 500, armature shaft 510 (explained later), multiple planetary gears 320 that are engaged with sun gear 310 and that rotate around the sun gear 310, planet carrier 330 that rotatably supports planetary gears 320 around sun gear 310 and that is integrated with output shaft 220, and tubular resin internal gear 340 that are engaged with planetary gears 320 on the circumference of planetary gear 320.

Overrunning clutch 350 rotatably supports internal gear 340 in one direction, only in direction rotatable with engine rotation. Overrunning clutch 350 is composed of clutch outer member 351 that acts as a first cylindrical portion integrated with the front side of internal gear 340, ring-shaped clutch inner member 352 that acts as a second cylindrical portion arranged to oppose the inner circumference of clutch outer member 351 and that is formed on the rear surface of center bracket 360 that acts as the fixing side that covers the front side of epicycle gear mechanism 300, and rollers 353 stored in roller storage portion (not shown) formed at an inclination to the inner circumferential surface of clutch outer member 351.

Center bracket 360 is disposed inside the rear side of housing 400. Housing 400 and center bracket 360 are coupled with ring spring 390 of which one end is fit to housing 400 and the other end is fit to center bracket 360. The rotational reaction received by clutch inner member 352 that configures overrunning clutch 350 is absorbed by ring spring 390 so that the reaction is not directly conveyed to housing 400.

Planet carrier 330 has flange-shaped projection portion 331 that extends in the radial direction to support planetary gears 320. Pins 332 that extend toward the rear are fixed onto flange-shaped projection portion 331, and pins 332 rotatably support planet carrier 320 via metal bearing 333.

Planet carrier 330 is rotatably supported by housing bearing 440 of which the front end is fixed on the inner front of housing 400 and center bracket bearing 370 fixed inside tubular portion 365 on the inner circumference of center bracket 360. Planet carrier 330 has ring groove 334 on the front end position of inner tubular portion 365, and snap ring 335 is fit into ring groove 334. Rotatable washer 336 mounted to planet carrier 330 is inserted between snap ring 335 and front end of inner tubular portion 365. The backward movement of planet carrier 330 is restricted by the direct contact of snap ring 335 to inner tubular portion 365 forward end via washer 336. The rear end of center bracket bearing 370 that supports the rear side of planet carrier 330 has flange portion 371 sandwiched between the rear end of inner tubular portion 365 and flange-shaped projection portion 331. The forward movement of planet carrier 330 is restricted by the direct contact of flange-shaped projection portion 331 to the rear end of inner tubular portion 365 via flange portion 371.

Concave notch 337 that extends axially is created on the rear side of planet carrier 330. The forward end of rotatable armature shaft 510 is supported via planet carrier bearings 380 arranged in concave notch 337.

Figure 3:
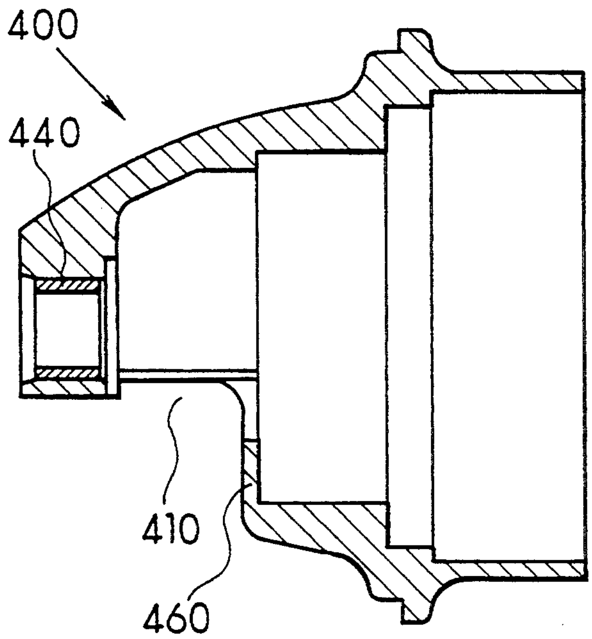
FIG. 3 is a cross-sectional view illustrating the housing side.
Figure 4:
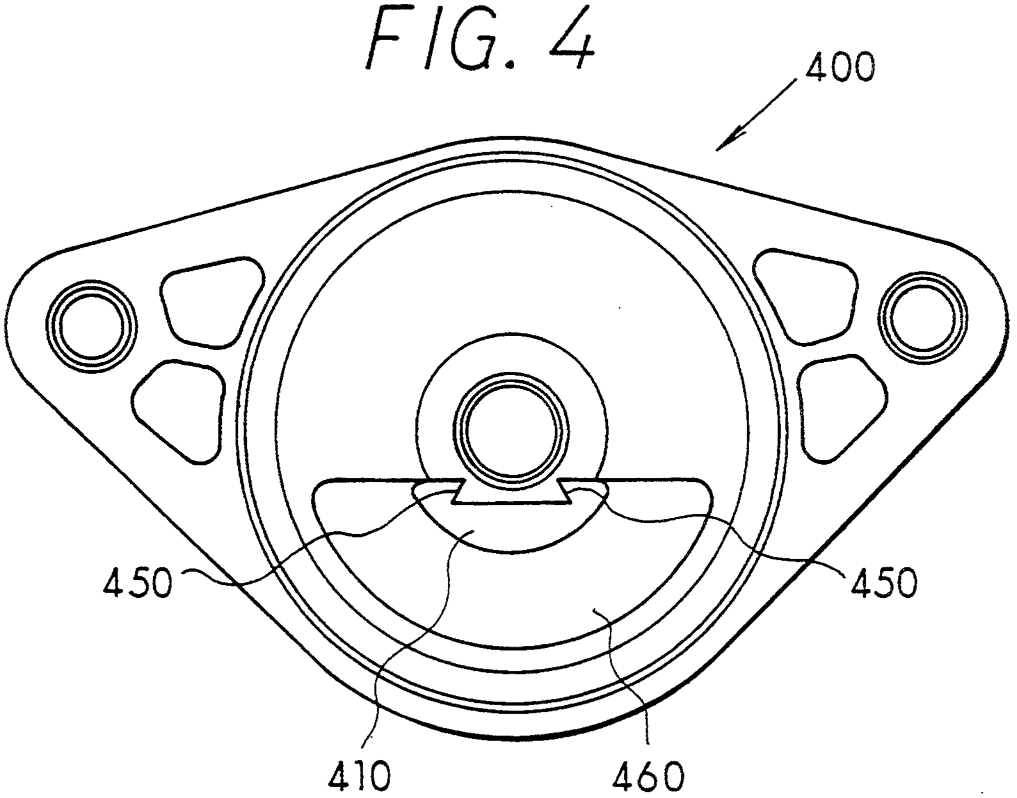
FIG. 4 is a front view illustrating the housing.
Figure 5:
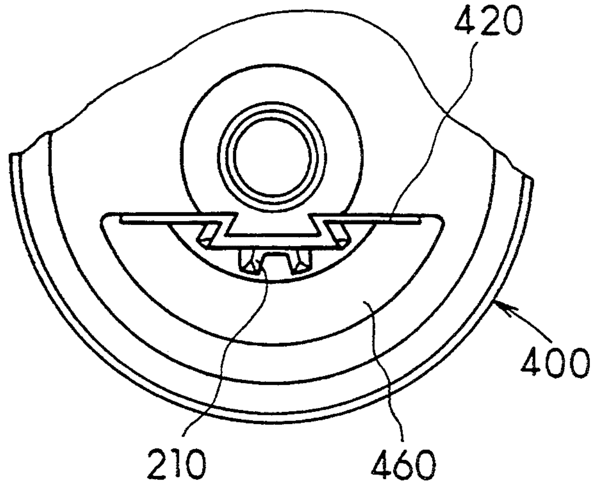
FIG. 5 is a front view illustrating the state with a shutter mounted on the housing.
Figure 6:
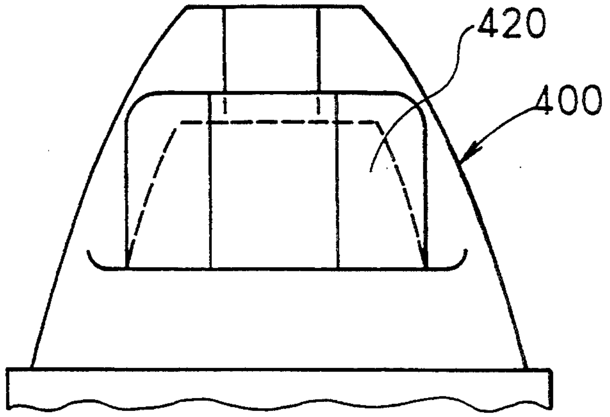
FIG. 6 is a side view illustrating the state with the shutter mounted on the housing.
Figure 7:
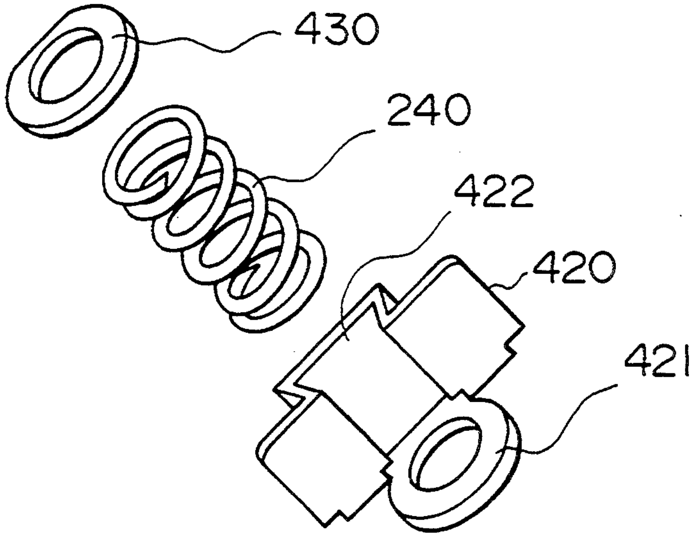
FIG. 7 is an exploded view illustrating the shutter.

As shown in FIGS. 1, 3 and 4, housing 400 supports the output shaft 220 with housing bearing 440 fixed on the inner front end of housing 400, and has water barrier wall 460 that acts as a projection portion to keep the clearance between housing 400 and the outer diameter of pinion gear 210 at the lower portion of opening 410 at a minimum to reduce the amount of rain water that enters through opening 410. On the lower front end of housing 400, two slide grooves 450 (FIG. 4) that extend axially are disposed, and shutter 420 (explained below) is set in slide grooves 450.

Shutter 420 is made of a resin material such as nylon, and is mounted on the periphery of output shaft 220 as shown in FIGS. 5 through 8. Shutter 420 is configured of the ring body 421 sandwiched between return spring 240 and pinion gear 210, and water barrier portion 422 that opens and closes opening portion 410 of housing 400. Water barrier portion 422 is bent so that it fits the two slide grooves 450 formed on the lower front end of housing 400 and that extend axially from both sides thereof. This configuration makes movement of water barrier portion 422 possible only in the axial direction of housing 400 together with ring body 421. Washer 480 is installed between shutter 420 and pinion gear 210.

When the starter starts and pinion gear 210 start advancing along output shaft 220, ring body 421 also starts advancing with pinion gear 210. Water barrier portion 422 integral with ring body 421 advances, thereby opening opening portion 410 of housing 400. When the starter stops and pinion gear 210 start retracting along output shaft 220, ring 421 retracts with pinion <ear 210 by spring 240. Water barrier portion 422 integral with ring 421 retracts, thereby closing opening portion 410 of housing 400. As a result, shutter 420 that acts as the opening/closing means prevents rain water that scatters as a result of centrifugal force of ring gear 100 from entering housing 400 due to the presence of water barrier portion 422 when the starter is not in operation.

When return spring 240 that directly biases pinion gear 210 is incorporated in the starter, the rotation of pinion gear 210 is conveyed to return spring 240, and return spring 240 receives the rotational force and widens. Thus, in conventional devices, as the rotation of pinion gear 210 was not conveyed to return spring 240, rotation restriction member such as washer had to be mounted between pinion gear 210 and return spring 240. However, in this embodiment of the present invention, a structure that does not convey the rotation of the pinion gear 210 to the return spring 240 is incorporated using the ring 421 of the shutter 420. Thus, rotation restriction member do not need to be used, resulting in fewer required pacts in the structure of the present invention as compared to conventional devices. Thus, the present invention facilitates assembly of the starter.

Tapered portion 222 is formed on the rear side of output shaft 220, and by contacting pinion helical spline 211 against tapered portion 222, backward movement of pinion gear 210 is prevented by tapered portion 222. Pinion fitting ring 250 is mounted on the front side of output shaft 220, and forward movement of pinion gear 210 is prevented by pinion fitting ring 250.

Figure 8:
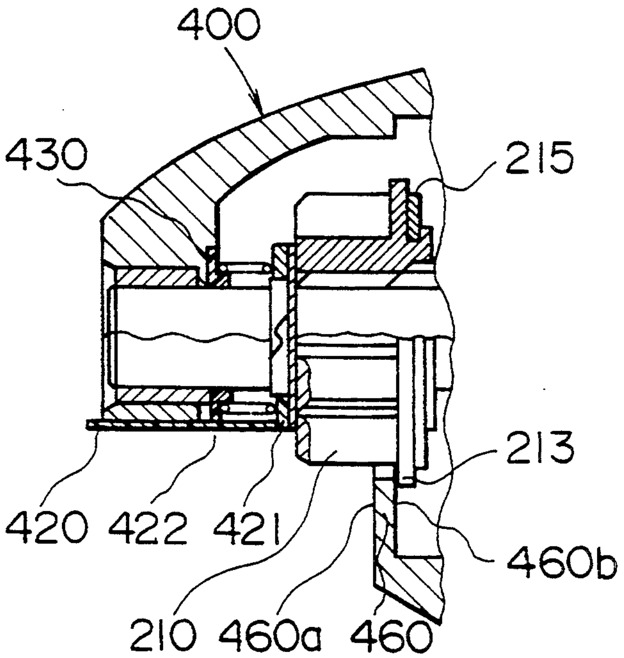
FIG. 8 is a main part cross-sectional view illustrating the operation of the pinion.

As shown in FIG. 1, when the starter is not in operation, front end **210*a* of pinon gear 210 does not protrude to ring gear 100 due to the positioning of front end 460*a* of water barrier wall 460. When the starter operates as shown in FIG. 8, flange 213 of pinion gear 210 does not contact with rear end 460*b* of water barrier wall 460, but pinion gear 210 engages with ring gear 100. Because of this, the water that scatters due to the centrifugal force, etc., of ring gear 100 does not directly enter housing 400**.

Water that does enter the housing 400 from the gap between housing 400 and pinion 210 is discharged outside of housing 400 via water drainage holes (not illustrated in the figure).

Figure 9:
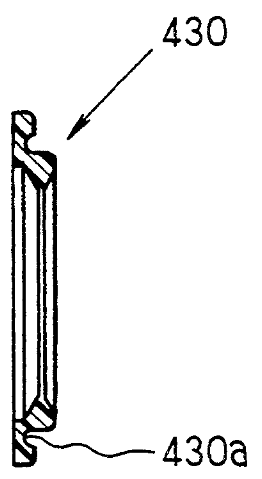
FIG. 9 is a cross-sectional view illustrating a seal member.
Figure 10:
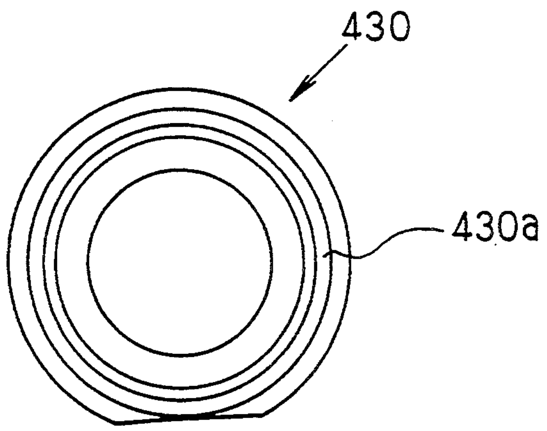
FIG. 10 is a front view illustrating the seal member.
Figure 11:
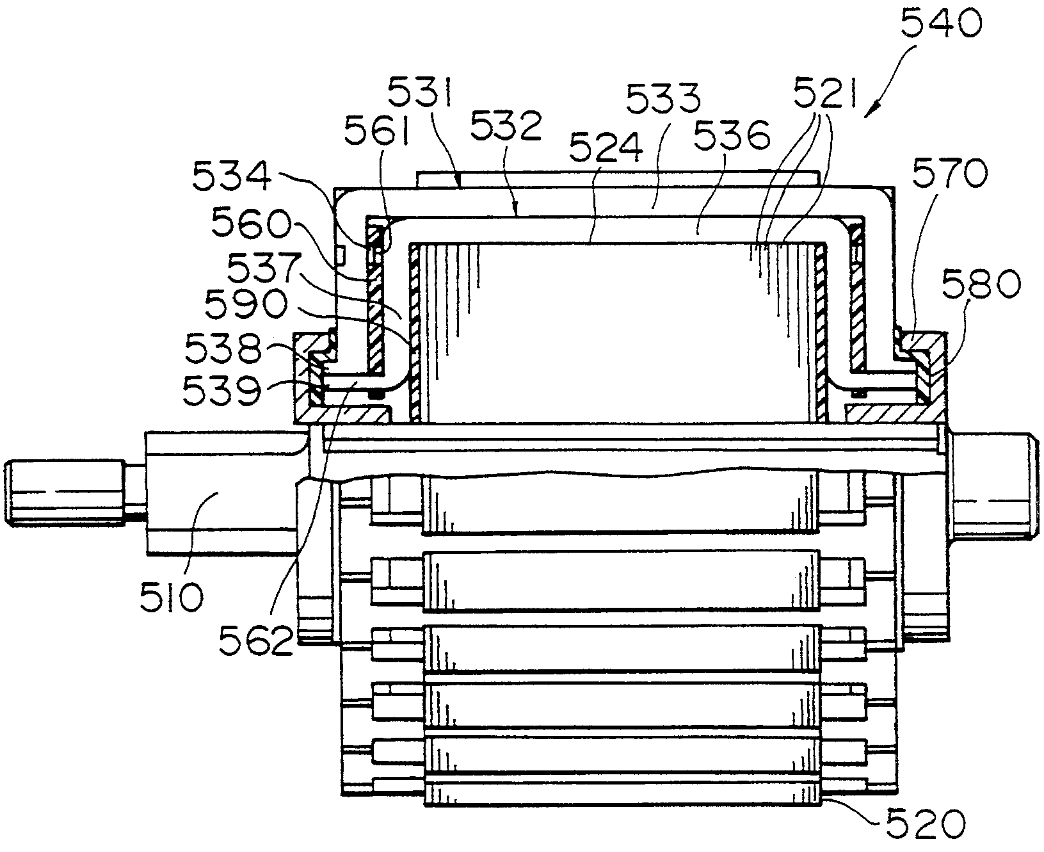
FIG. 11 is a cross-sectional view illustrating the side of an armature.

As shown in FIGS. 9 and 10, seal member 430 has ring groove **430*a* around a circumferential side thereof. One end of return spring 240 is disposed in ring groove 430*a*. Seal member 430 seals the periphery of output shaft 220, and prevents rain water and dust that have entered through opening portion 410 of housing 400 from entering housing bearing 440 on the front end of housing 400**.

Motor 500 is enclosed by yoke 501, motor wall 800, and brush holding member 900 (described below). Motor wall 800 sandwiches epicycle gear mechanism 300 between center bracket 360, and prevents lubrication oil in epicycle gear mechanism 300 from entering motor 500.

Motor 500 includes armature 540 (refer to FIG. 11) that comprises armature shafts 510, armature core 520 fixed to armature shaft 510 and integrally rotated therewith, and armature coil 530, as well as fixed magnetic pole 550 that rotates armature 540.

Armature shaft 510 is rotatably supported by planet carrier bearing 380 o the inner rear of planet carrier 330, and brush holding member bearing 564 is fixed on the inner circumference of the brush holding member 900. The front end of armature shaft 510 is inserted through the inner side of epicycle gear mechanism 300, and as mentioned above, sun gear 310 of the epicycle gear mechanism 300 is formed on the outer circumference of the forward end of armature shaft 510.

In this embodiment, multiple, for example, twenty-five, upper coil bars 531 and an equal number of lower coil bars 532 are used for armature coil 530. Each of upper coil bars 531 and lower coil bars 532 are radially piled or stacked to form two-layer winding coils. Each upper coil bar 531 and each lower coil bar 532 is combined, and extention portions 538 and 539 of each upper coil bar 531 and each lower coil bar 532 are electrically connected to form a ring-shaped coil.

Upper coil bar 531 composed of a material such as copper with an outstanding conductivity has upper coil piece 533 that is held in the outer circumference of the slot (not illustrated), and that extends axially in parallel to fixed magnetic pole 550, and has two upper coil ends 534 that are bent radially inward from both ends of upper coil piece 533 and that extend perpendicularly to the axial direction of armature shaft 510. Upper coil piece 533 and upper coil ends 534 can be integrally shaped using cold forging, can be bent and formed in a -shape by press working, or can be formed by welding upper coil piece 533 with the two upper coil ends 534, each of which is made from different material.

As with upper coil bar 531, lower coil bar 532 is composed of a material such as copper having an outstanding conductivity and has lower coil piece 536 that is held in the outer circumference of the slot (not illustrated) and that extends axially in parallel to fixed magnetic pole 550, and has two lower coil end 537 that are bent radially inward from both ends of the said lower coil piece 536 and that extend perpendicularly to the axial direction of shaft 510. Lower coil piece 536 and two lower coil ends 537 can be integrally cold cast, can be bent and formed into a -shape with a press, or can be separately formed as lower coil piece 536 and the two lower coil ends 537 that are connected together via welding, etc., as wit upper coil bar 531.

The insulation of each upper coil end 534 and each lower coil end 537 is insured with insulation spacer 560. The insulation between each lower coil end 537 and armature core 520 is ensured with resin (e.g., nylon or phenol resin) insulation ring 590.

Upper inner extension portion 538 that extends axially is created on the inner circumference ends of the two upper coil ends 534. Lower internal extension portion 539 on the inner end of lower coil bar 536 is layered with the inner circumference of upper internal extension portion 538. Upper and lower internal extension portions 538 and 539 are electrically and mechanically connected by such means as welding. The outer circumference of upper internal extension portion 538 contacts the inner surface of outer circumference ring portion of the fixing member 570, which is press-fixed onto armature shaft via insulation cap 580.

In armature 540, both upper coil ends 534 of upper coil bar 531 and both lower coil ends 537 of lower coil bar 532 that make up armature coil 530 are installed perpendicular to the axial direction of armature shaft 510.

Fixed magnetic pole 550 is fixed onto the inside of yoke 501 via fixing sleeves (not illustrated) disposed on the inner circumference of fixed magnetic pole 550. In this embodiment, permanent magnets are used. But coils that electrically generate a magnetic force can also be used in lieu of the permanent magnets.

As shown in FIG. 1, magnet switch 600 is held by brush holding member 900 (described below) and is disposed in end frame 700 (also described below). Magnet switch 600 is fixed so as to be approximately perpendicular to armature shaft 510.

Via electrical power supply, magnet switch 600 drives plunger 610 upward, and contacts two contacts, lower movable contact 611 and upper movable contact 612, that move integrally with plunger 610 to sequentially contact head 621 of terminal bolt 620 and contact portion 631 of fixed contact 630. A battery cable (not illustrated) is connected to terminal bolt 620.

Figure 12:
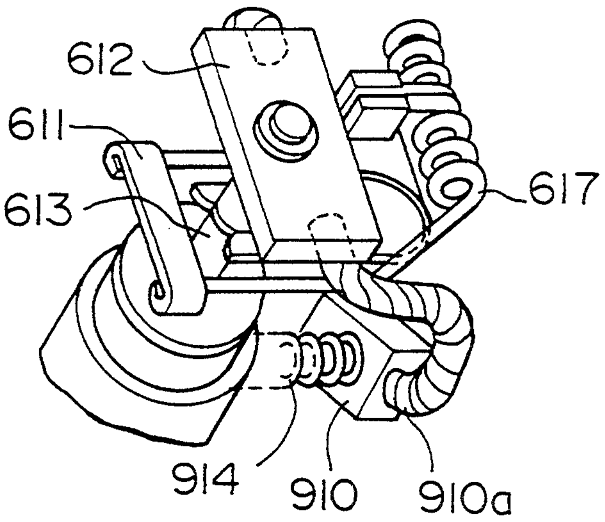
FIG. 12 is a perspective view illustrating a magnet switch plunger.

Plunger shaft 515 that extends upward over the plunger 610 is fixed on the upper side of plunger 610. Plunger shaft 615 protrudes upward from the through hole on the center of stationary core 642. Upper movable contact 612 that slides freely through the vertical direction along plunger shaft 615 is located on the upper side of stationary core 642 of plunger 610. Upper movable contact 612 is restricted from moving over the upper end of plunger shaft 615 by fixing ring 616 installed on the upper end of plunger shaft 615 as shown in FIG. 12. As a result, the upper movable contact 612 slides freely in the vertical direction along plunger shaft 615 between fixing ring 616 and stationary core 642. Upper movable contact 612 is constantly biased upward by contact pressure spring 670 formed by a plate spring installed on plunger shaft 615.

Upper movable contact 612 is composed of a metal such as copper having an outstanding conductivity. When both ends of the upper movable contact 612 move upward, the two contact portions 631 on fixed contact 630 are contacted. Each lead wire 910*a* for the pair of brushes 910 is electrically and mechanically connected with caulking or welding to upper movable contact 612. The ends of resistors 617 that act as multiple current restriction means, two in this embodiment, are inserted and electrically and mechanically fixed to the grooves on upper movable contact 612.

Each lead wire 910*a* for pair of brushes 910 is electrically and mechanically connected with caulking or welding to upper movable contact 612. However, upper movable contact 612 and each lead wire 910*a* of brush 910 can be integrally formed.

Resistor 617 is used to slow down rotation speed of motor 500 when the starter initially starts. Metal wires with a large resistance value may be wound to configure the resistor. Lower movable contact 611 located below head portion 621 of terminal bolt 620 is fixed with caulking, etc., to the other end of resistor 617.

Lower movable contact 611 is composed of a metal such as copper having an outstanding conductivity. This contacts the upper surface of stationary core 642 when magnet switch 600 stops and plunger 610 is at the lower position. When resistor 617 moves upward with the movement of plunger shaft 615, lower movable contact 611 will contact head portion 621 of terminal bolt 620 before upper movable contact 612 contacts contact portion 631 of fixed contact 630.

Figure 13:
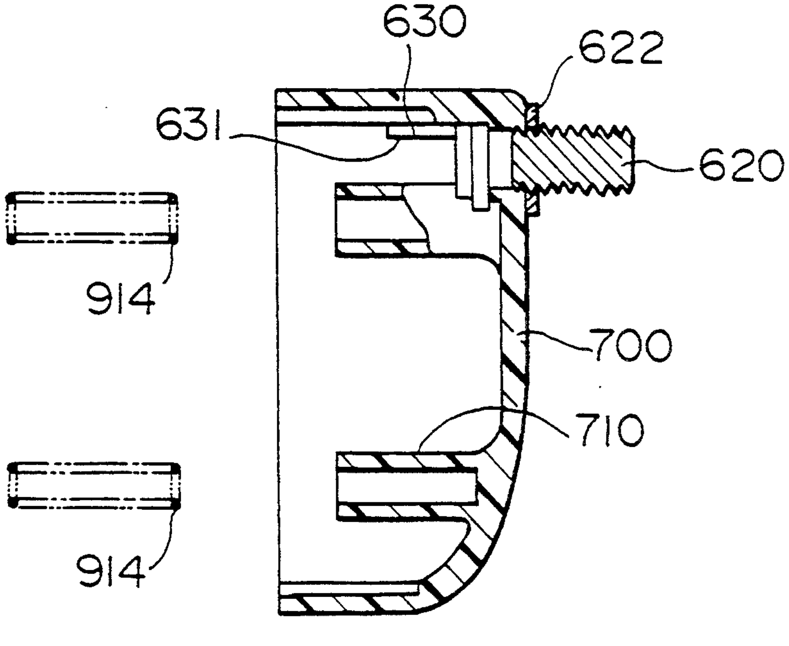
FIG. 13 is a cross-sectional view illustrating an end frame and brush spring.

As shown in FIG. 13, end frame 700 is a magnet switch cover made from resin such as phenol resin. Magnet switch 600 is stored inside the frame 700.

Spring holding pole 710 that holds compressed coil spring 914 that biases brush 910 toward the front is installed on rear side of end frame 700 so as to protrude forward in correspondence to positions of brushes 910.

Brush holding member 900 separates the inner side of yoke 501 and the inner side of end frame 700 and functions to rotatably support the end of armature shaft 510 via brush holder bearing 564. In addition, brush holding member 900 can act as the brush holder, can support magnet switch 600, and can hold the pulley that guides string-shaped member 680. Brush holding member 900 has a hole (not shown) through which the string-shaped member 680 passes.

Figure 14:
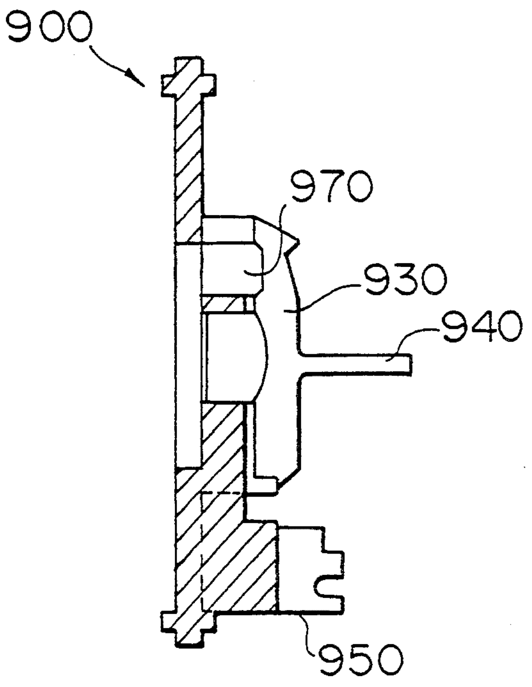
FIG. 14 is a vertical-cross-sectional view illustrating a brush holding member.
Figure 15:
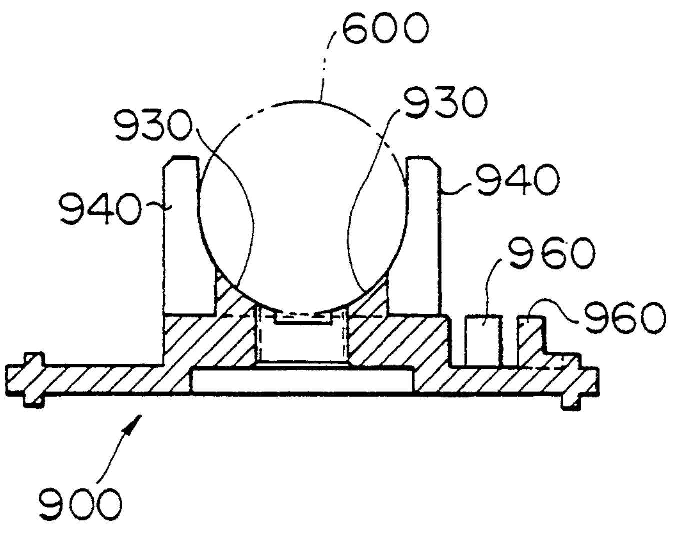
FIG. 15 is a horizontal ross-sectional view illustrating the brush holding member.

Brush holding member 900 is a partition made of cast metal such as aluminum. As shown in FIGS. 14 and 15, there are multiple brush holding holes, two on top and two on bottom in this embodiment, that hold brush 910 in the axial direction. The upper brush holding hole is a hole that holds brush 910 that receives a positive voltage, and this upper brush holding hole holds the brush 910 via a resin (e.g., nylon, phenol resin) insulation cylinder. The lower brush holding hole is a hole that holds the brush 910 connected to ground, and this lower brush holding hole directly holds the brush 910 inside the hole.

By holding the brushes 910 with brush holding member 900, a brush holder separated from the starter is not required. Thus, the number of starter parts can be reduced, and the man-hours required for assembly can be reduced.

The front end of the brush 910 is biased by compressed coil spring 914 to the rear side of upper coil end 534 on the rear side of armature coil 530.

Next, the operation of the above-described starter will be explained according to the electrical circuit diagrams shown in FIGS. 16A through 16C.

Figure 16A:
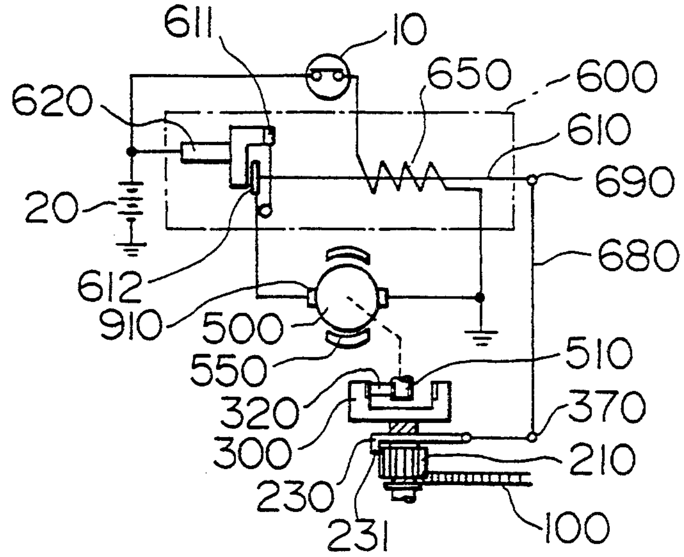
FIGS. 16A, 16B and 16C are electrical circuit diagrams indicating the states with the pinion operating.

When key switch 10 is set to the start position by the operator as shown in FIG. 16A, attraction coil 650 in magnet switch 600 is energized by battery 20. When attraction coil 650 is energized, plunger 610 is attracted by the magnetic force generated by attraction coil 680 so that it is lifted upward.

When plunger 610 starts to rise, upper movable contact 612 and lower movable contact 611 also rise, and the rear end of string-shaped member 680 also rises. When the rear end of string-shaped member 680 rises, the forward end of string-shaped member 680 is pulled downward, and pinion rotation restriction mender 230 lowers. When pinion rotation restriction member 230 lowers, and restriction claw 231 engage with notches 214 on the circumference of pinion gear 210, lower movable contact 611 contacts head 621 of terminal bolt 620. The voltage from battery 20 is applied to terminal bolt 620, and the voltage of terminal bolt 620 is conveyed to the upper brush 910 via lower movable contact 611, resistor 617, upper movable contact 612, and lead wire 910*a*. In other words, the low voltage conveyed with resistor 617 is conveyed to armature coil 530 via upper brush 910. As lower brush 910 is constantly grounded via brush holding member 900, armature coil 530 configured with upper coil bars 531 and lower coil bars 532 combined into a coil is energized with a low voltage. Armature coil 530 then generates a relatively weak magnetic force. This magnetic force acts on (attracts or repulses) the magnetic force of fixed magnetic poles 550, causing armature 540 to rotate at a low speed.

When armature shaft 510 rotates, planetary gear 320 in epicycle gear mechanism 300 are rotated and driven by sun gear 310 on front end (armature shaft 510. If the planetary gears 320 apply the rotary torque in the direction which the ling gear 100 is rotated and driven to the internal gear 340 via the planet carrier 330, the rotation of the internal gear 340 will be restricted by the function of the overrunning clutch 350. In other words, the internal gear 340 will not rotate, so the planet carrier 330 will rotate in reduced speed due to the rotation of the planetary gear 320. If the planet carrier 330 rotates, pinion gear 210 will also attempt to rotate, but as the rotation of pinion gear 210 is restricted by pinion rotation restriction member 230, pinion gear 210 will advance along helical spline 221 of output shaft 220.

When pinion gear 210 advances, shutter 420 will also advance causing the opening 410 of the housing 400 to open. With the advance of pinion gears 210, pinion gear 210 will completely engage with engine's ring gear 100, and then will contact pinion fitting ring 250. When pinion gear 210 advances, restriction claw 231 will be disengaged from notches 214 on pinion gear 210, and then restriction claw 231 will drop behind washer 215 installed on the rear surface of the pinon gear 210.

Figure 16B:
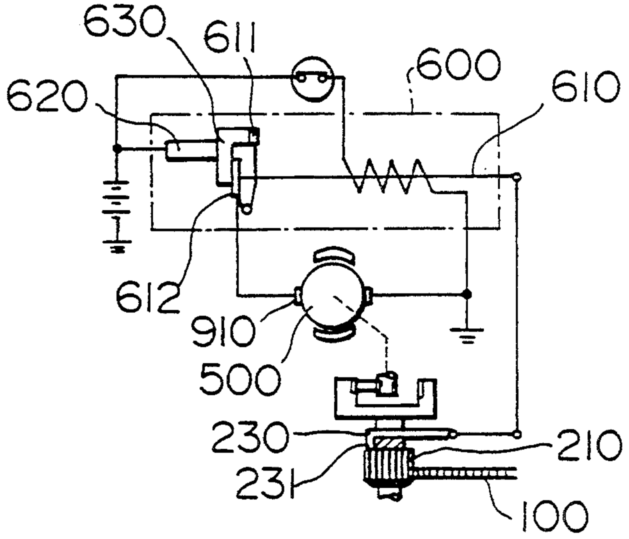

On the other hand, when pinion gear 210 are advanced, contact 612 will contact contact portion 631 of fixed contact 630 as shown in FIG. 16B. The battery voltage of terminal bolt 620 will be directly conveyed to upper brush 910 via upper movable contact 12 and lead wire 910*a*. In other words, a high current will flow to armature coil 530 configured of each upper coil bar 531 and each lower coil bar 532. Armature coil 530 will generate a large magnetic force, and will rotate armature 540 at a high speed.

The rotation of drive shaft 220 relative to armature shaft 510 is reduced by the epicycle gear mechanism 300 thus increasing the rotational torque, and planet carrier 330 will be rotated and driven. At this time, front end of pinion gear 210 will contact pinion fitting ring 250, and will rotate together with the planet carrier 330. Pinion gear 210 are engaged with engine's ring gear 100, so pinion gear 210 will rotate and drive ring gear 100 thereby rotating and driving the engine's output shaft for engine starting.

Next, when the engine starts and ring gear 100 rotate faster than pinion gear 210, a force to retract the pinion gear 210 will occur due to the function of the helical spline. The retraction of pinion gear 210 will be prevented by rotation restriction claw 231 that have dropped behind pinion gear 210, and will prevent early separation of pinion gear 210. Thus, the engine can be assuredly started. When ring gear 100 rotates faster than pinion gear 210 due to the starting of the engine, pinion gear 210 will be rotated and driven by the rotation of ring gear 100. The rotation torque conveyed to pinion gear 210 from the ring gear 100 will be conveyed via planet carrier 330 to pins 332 that support planetary gears 320. In other words, planetary gears 320 are driven by the planet carrier 330. As a torque rotating in reverse of that when the motor is started will be applied on internal gear 340, overrunning clutch 350 will allow rotation of ring gears 100. In other words, when a torque rotating in a direction reverse to that when the motor 500 is started is applied on internal gear 340, rollers 353 of overrunning clutch 340 will separate from concave notch 355 on clutch inner 352, and rotation of the internal gear 340 will be possible.

When the engine starts, the relative rotation in which ring gear 100 rotates and drives pinion gear 210 will be absorbed by overrunning clutch member 350, and armature 540 will not be rotated and driven by the engine.

Figure 16C:
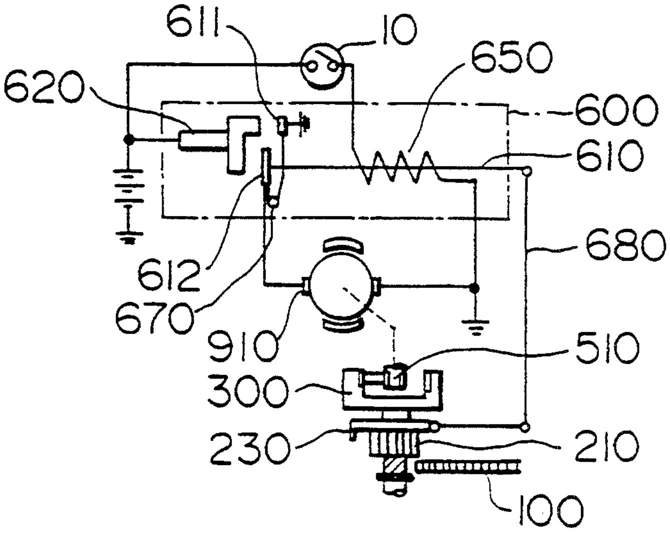

When the engine is started, key switch 10 is removed from the start position by the operator as shown in FIG. 16C, and the electric current supply to attraction coil 650 in magnet switch 600 is stopped. When the energizing of the attraction coil 650 Ls stopped, plunger 610 will return downward due to the function of compressed coil spring 660. The upper movable contact 612 will be separated from contact portion 631 of fixed contact 630, and then lower movable contact 611 will also be separated from head portion 621 of terminal bolt 620 causing the conductivity to upper brush 910 to be stopped.

When plunger 610 is returned downward, pinion rotation restriction members 230 will return upward due to the function of return spring 236 of pinion rotation restriction member 230, and restriction claw 231 will be separated from behind pinion gear 210. Pinion gear 210 will be returned backward by the function of return spring 240, and the engagement of pinion gear 210 and ring gear 100 will be disengaged. At the same time, the rear end of pinion gear 210 will contact flange-shaped protrusion portion 222 on the output shaft 220. In other words, pinion gear 210 are returned to the position before the starter started.

When plunger 610 is returned downward, lower movable contact 611 contacts the upper surface of stationary core 642 on magnet switch 600, and the lead wires on upper brush 910 are conducted in the order of upper movable contact 612, resistor 617, lower movable contact 611, stationary core 642, magnet switch cover 640 and brush holding member 900. In other words, upper brush 910 and lower brush 910 are short circuited via brush holding member 900. On the other hand, an electromotive force is generated on armature coil 530 by the coasting rotation of armature 540. This electromotive force is short-circuited via the upper brush 910, brush holding member 900 and lower brush 910, and thus a braking force is applied on the coasting rotation of armature 540. As a result, armature 540 stops quickly.

In this embodiment, when the starter is not in operation, front end 210*a* of pinion gear 210 does not protrude from front end 460*a* of the water barrier wall 460 in the housing 400. When the starter operates, flange 213 of pinion gear 210 contacts rear end 460*b* of the water barrier wall 460, and pinion gear 210 engages with ring gear 100. Thus, the water barrier wall 460 prevents the rain water, etc., that scatters due to the centrifugal force, etc., of ring gear 100 from directly entering housing 400. The durability of the sliding portion between pinion 210 and output shaft 220 is greatly improved as the entrance of rust, dust, dirt, mud, etc. is prevented.

Figure 17:
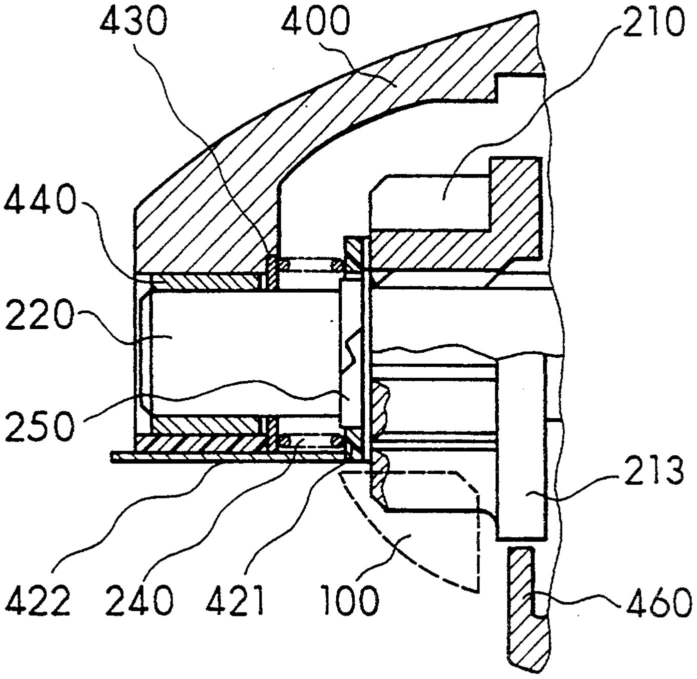
FIG. 17 is a side cross-sectional view illustrating the main parts of the starter according to the second embodiment of the present invention.

As shown in FIG. 17, the second embodiment of the starter according to the present invention can have flange 213 of pinion gear 210 on the same plane as water barrier wall 460 during engagement of pinion gear 210 with ring gear 100. Even when this structure is used, if the starter operates as described in the first embodiment, the gap between flange 213 and water barrier wall 460 can be kept to a minimum, and the water due to the centrifugal force of ring gear 100 can be prevented from entering housing 400.

Figure 18:
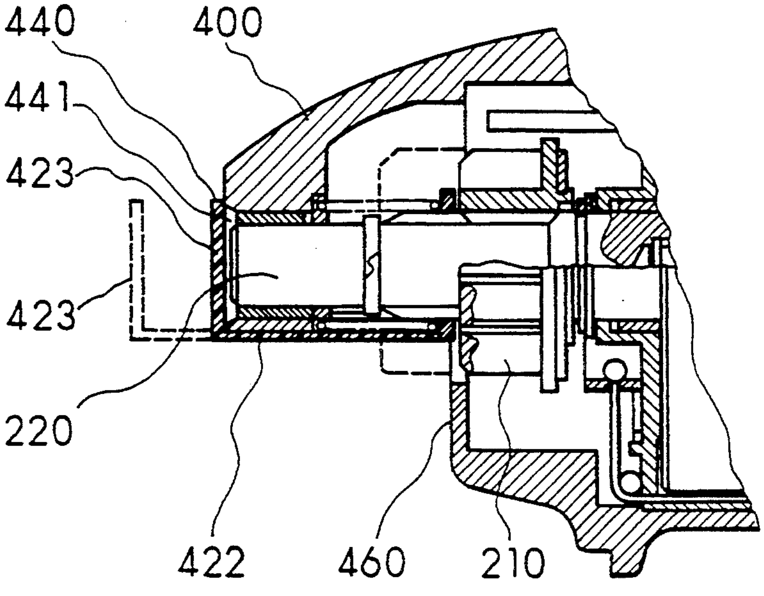
FIG. 18 is a side cross-sectional view illustrating the main parts of the starter according to the third embodiment of the present invention.

In the third embodiment of the present invention as shown in FIG. 18, plugging portion 423 that plugs opening holes 441 for bearings 440 on the end of housing 400 is formed integrally on one end of water barrier portion 422. With this structure, the entering of water through opening hole 441 via the bearings 440 into housing 440 can be securely prevented with plugging portion 423 when the starter is stopped. Thus, the entering of foreign material into bearing 440 can be prevented without adding other parts to plug opening hole 441.

Figure 19:
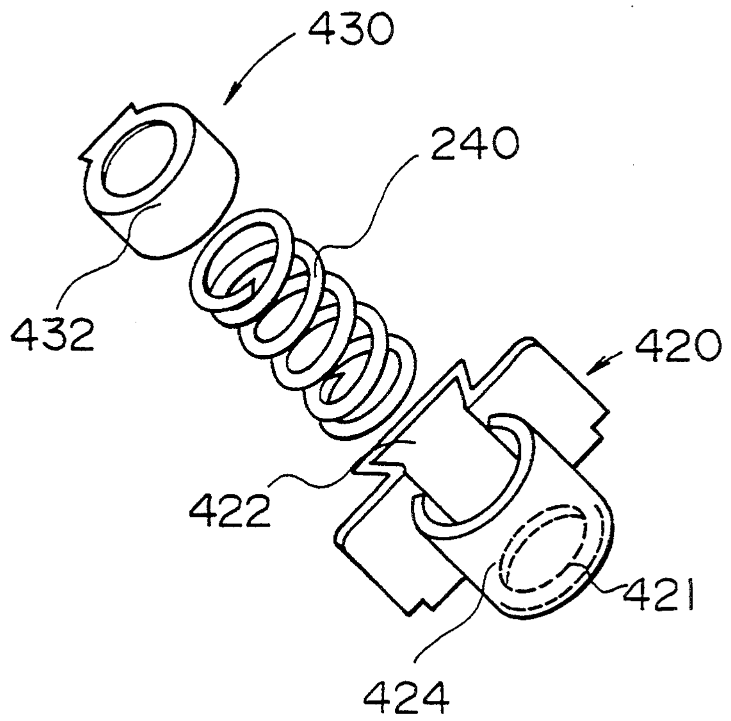
FIG. 19 an exploded view illustrating the shutter, spring and seal members in the fourth embodiment of the present invention.
Figure 20:
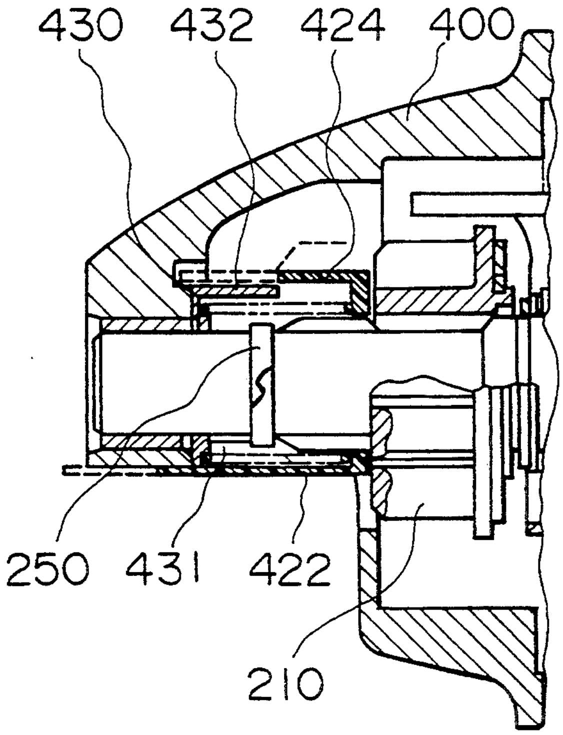
FIG. 20 is a side cross-sectional view illustrating the main parts of the fourth embodiment.

The fourth embodiment will be explained according to FIGS. 19 and 20.

In comparison with shutter 420 described in the first embodiment, cylinder 424 is integrally formed on ring 420 above water barrier portion 422. Seal member 430 includes opening 431 for opening the portion where shutter 420 slides, and has approximate cylindrical portion 432 having an outer diameter smaller than the inner diameter of cylinder 424.

When pinion 210 advances in the inner circumference of housing 400 and shutter 420 advances, the end of approximate cylindrical portion 432 of seal member 430 is matched in the axial direction with the end of cylinder 424 so as to store one end of cylinder 424 when the starter is not operating.

As shown with the dotted lines, when the starter operates, pinion 210 and advances and contacts pinion fitting ring 250, thus restricting further movement. At this time, cylinder 424 overlaps with the outer circumference of approximate cylindrical portion 432, and the end of cylinder 424 is disposed in groove 401 of housing 400.

With the rotation of the engine's ring gear 100 at this time, water scatters into the housing 400 from window on housing 400. After that, pinion 210 retracts, and returns to the position shown in FIG. 20. Even if the scattered water, etc., from when the starer operated remains in housing 400, cylinder 424 covers the outside of helical spline 21. Thus, the scattered water does not enter or affect helical spline 21 and most water is prevented from contacting helical spline 21.

Figure 21:
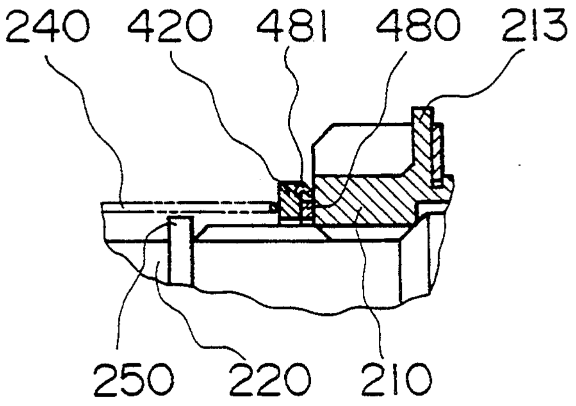
FIG. 21 is a side cross-sectional view illustrating the main parts of the starter according to the fifth embodiment of the present invention.

As shown in FIG. 21, seal member 481 is inserted to form a seal between shutter 420 and pinion 210, so that the entry of foreign material between fine gaps between shutter 420 and pinion 210 is prevented.

The fifth embodiment of the starter according to the present invention is explained according to FIGS. 22 through 25.

Gear chamber 10 is formed in a starter housing 1, and window 11 opens nearing gear 9 on the front bottom of gear chamber 10. End portion 12 of housing 1 rotatably supports the end of drive or outpost shaft 2, and the rear end surface of end portion 12 contacts the front portion of gear chamber 10. Drive shaft 2 is rotated by the starter motor (not shown). Guide hole 13 opens on end portion 12 of housing 1 over drive shaft 2 in the forward axial direction from the rear end surface of end portion 12.

Pinion gear 3 fits onto drive shaft 2 in gear chamber 10 so that relative rotation and axial sliding happens freely. Pinion gears 3 can advance with the rotation of drive shaft 2 by the magnet switch or via an inertial mechanism (neither shown).

Figure 24:
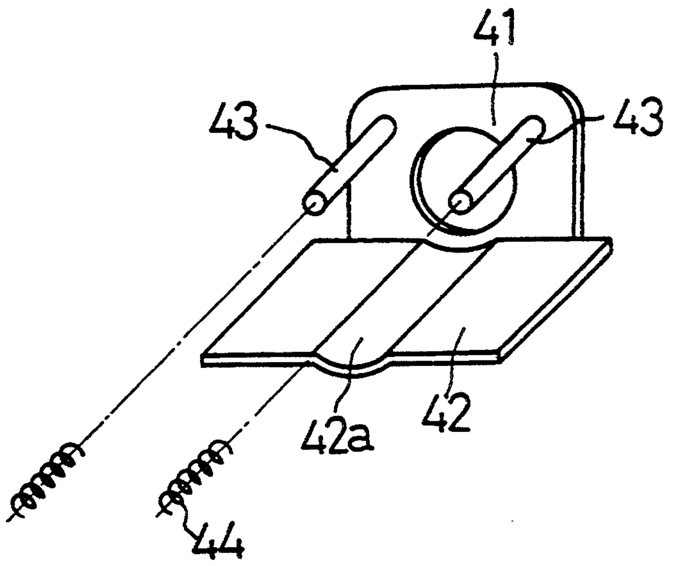
FIG. 24 is a perspective view illustrating the window shutter illustrated in FIG. 22.

Window shutter 4 is positioned in front of pinion gears 3 at the front of gear chamber 10. Window shutter 4 is composed of plate-shafted base portion 41 fit to drive shaft 2 in the radial direction so that it can freely slide, plate-shaped barrier portion 42 that extends forward from the lower end of base portion 41 and that opens and closes window 11 by advancing and retracting, bar-shaped guide portion 43 that protrudes in the axial forward direction from the upper portion of base portion 41 and of which the end is fit through guide hole 13, and coil spring 44 that is wound on guide portion 42 and of which the base end is fit to the rear end of end portion 12 of housing 1. An enlarged perspective view of window shutter 4 is shown in FIG. 24.

Base portion 41 is pressed against the forward end of pinion gear 3 via washer 5 that is biased by coil spring 44. Guide portion 43 and coil spring 44 are laid as a pair. The front end portion of barrier portion 43 constantly slides below end portion 12 of housing 1. The position of window shutter 4 is held by guide portion 43 and barrier portion 42, and advances and retracts in the axial direction with pinion gear 3. Pinon gears 3 try to rotate window shutter 4 via washer 5, but the rotation of window shutter 4 is restricted by guide portion 43, etc.

Element 6 is a collar fit and fixed onto drive shaft 2, and the advance off pinion gears 3 is suppressed by collar 6 via barrier portions 42 and washer 5. Collar 6 fits the ring groove on drive shaft 2 using elasticity.

With this structure, window shutter 4 pushed forward by pinion gear 3 opens window 11 when pinion gear 3 advances, allowing pinion gear 3 and ring gear 9 to engage. When pinion gear 3 retract, window 11 retracts with pinion gear 3 by coil spring 44. When barrier portion 42 is at the far retract end, barrier portion 42 almost completely shields window 11, and the entry of water and other contaminants into gear chamber 10 is prevented.

Figure 22:
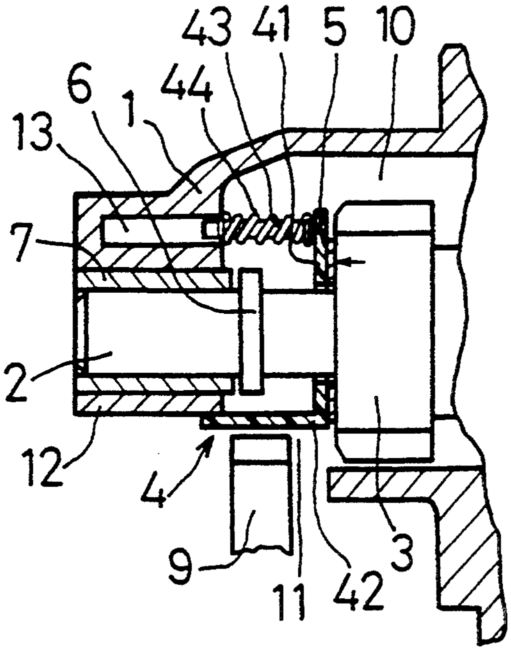
FIG. 22 is an axial cross-sectional view illustrating the main parts of the starter according to the sixth embodiment of the present invention.
Figure 23:
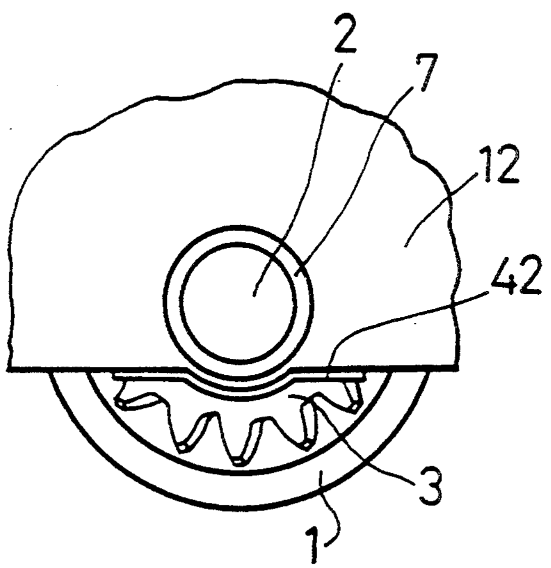
FIG. 23 is a front view illustrating the axial direction view of the main parts of the starter illustrated in FIG. 22.
Figure 25:
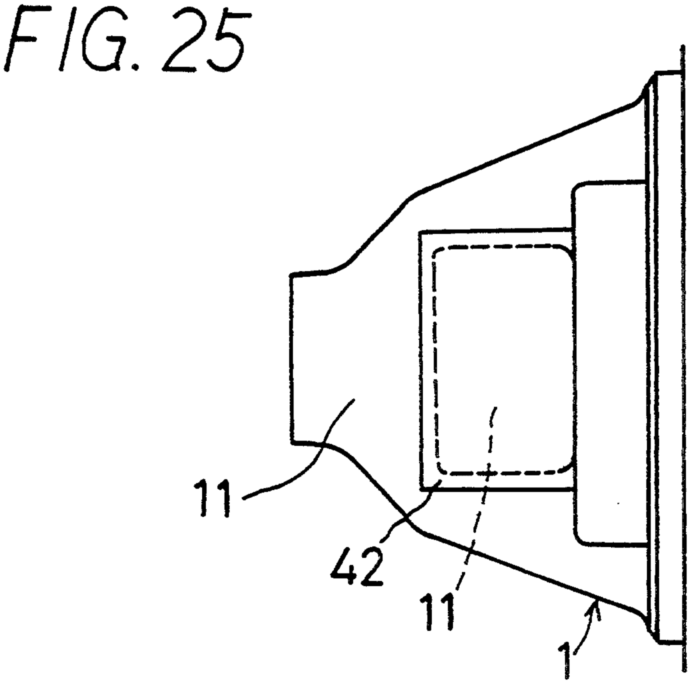
FIG. 25 is a top view illustrating the main parts of the starter illustrated in FIG. 22.

FIG. 23 illustrates the front view of the center portion of housing 1 in FIG. 22 viewed from the axial front direction. FIG. 25 is an enlarged top view of main parts of housing 1 viewed from the bottom. As can be seen in FIG. 25, the left and right ends of barrier portion 42 are laid so as to layer over window circumference of housing 1 that separates window 11. As shown in FIG. 24, on the middle portion of barrier portion 42, slightly concave portion **42*a* is formed to expand outward slightly in the axial direction. Element 7** represents the bearing metal.

Figure 26:
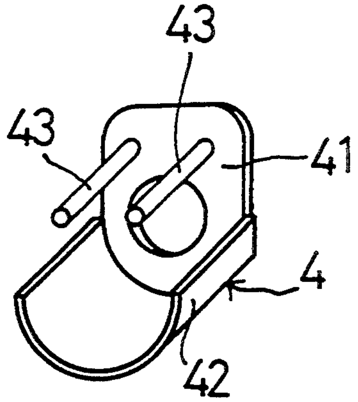
FIG. 26 is a perspective view illustrating the deformed state of the window shutter illustrated in FIG. 22.
Figure 27:
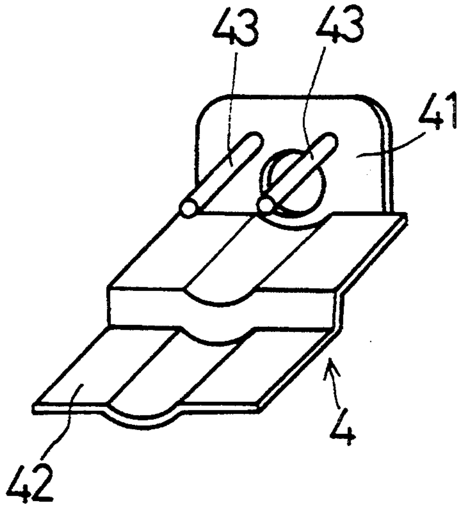
FIG. 27 is a perspective view illustrating the deformed state of the window shutter illustrated in FIG. 22.

The other shapes of barrier portion 42 of window shutter 4 are shown in FIGS. 26 and 27.

The shape of window shutter 4 can be changed as long as barrier portion 42 is a structure driven by pinion gear 3 and that opens and closes window 11. Barrier portion 42 can be a split cylinder shape as shown in FIG. 26 or a stepped shape as shown in FIG. 27.

Figure 28:
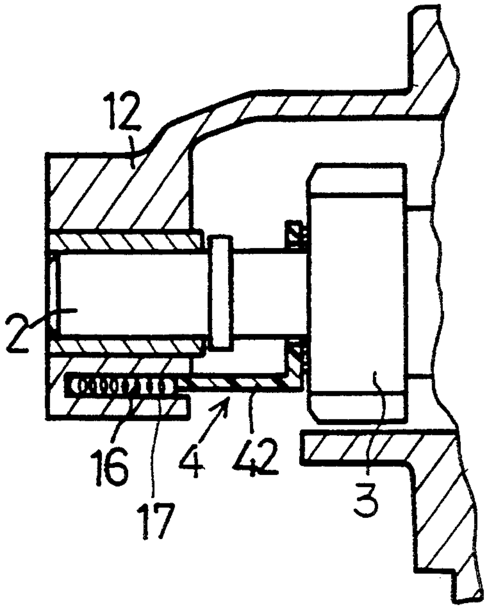
FIG. 28 is an axial cross-sectional view illustrating the main parts of the starter according to the seventh embodiment.

The seventh embodiment is depicted in FIG. 28. In this embodiment, guide groove 17 storing spring 16 in the axial direction is formed on lower end portion 12 of housing 1. Barrier portion 42 of window shutter 4 can be stored in this guide groove 18.

Figure 29:
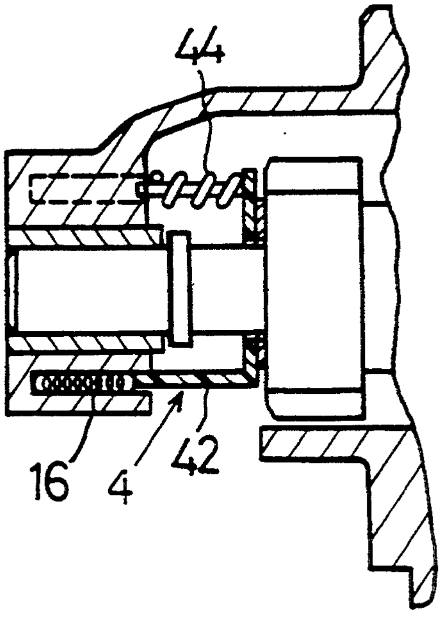
FIG. 29 is an axial cross-sectional view illustrating the main parts of the starter according to the eighth embodiment.

The eighth embodiment of the present invention is shown in FIG. 29. In this embodiment, the shape of window shutter 4 is a combination of the sixth and seventh embodiments. In this embodiment, either spring 16 or coil spring 44 can be eliminated.

Figure 30:
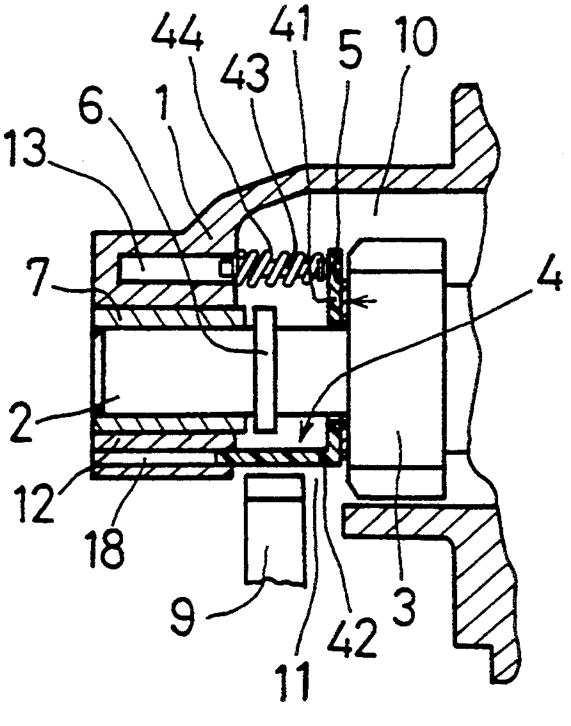
FIG. 30 is an axial cross-sectional view illustrating the main parts of the starter according to the ninth embodiment.

The ninth embodiment of the present invention is shown in FIG. 30. In this embodiment, guide groove 18 is formed in the axial direction of the left and right sides of lower end portion 12 of housing 1. Barrier portion 42 of window shutter 4 is guided to the left and right ends with guide groove 18.

Figure 31:
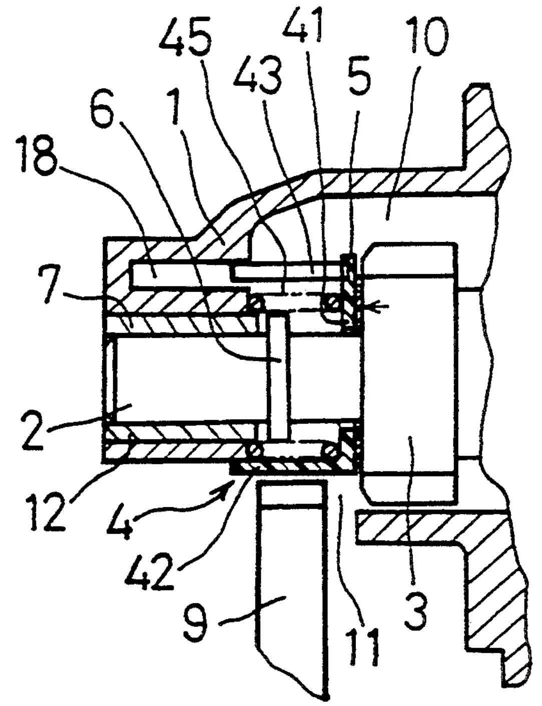
FIG. 31 is an axial cross-sectional view illustrating the main parts of the starter according to the tenth embodiment.

The tenth embodiment of the present invention is shown in FIG. 31. In this embodiment, coil spring 45 is disposed proximate drive shaft 2 between the rear end of end portion 12 and base portion 41 of window shutter 4.

Figure 32:
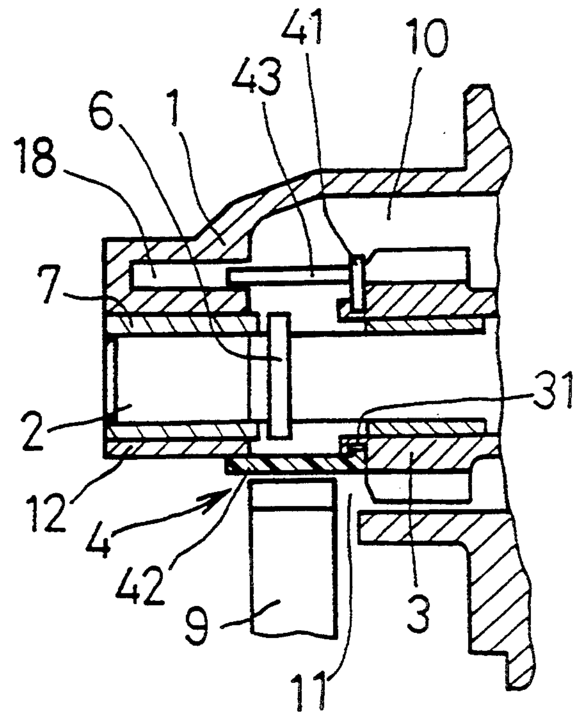
FIG. 32 is an axial cross-sectional view illustrating the main parts of the window shutter according to the eleventh embodiment.
Figure 33:
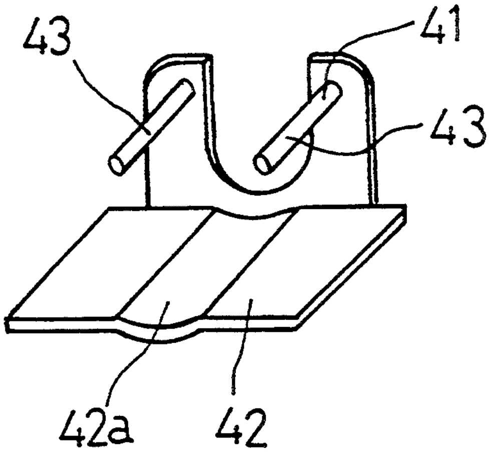
FIG. 33 is a perspective view of the window shutter illustrated in FIG. 32.

Each of the seventh through tenth embodiments satisfies the same requirements as does the sixth embodiment. In the above embodiment, a structure that advances window shutter 4 when pinion gear 3 advances and that retracts window shutter 4 with coil spring 44 has been defined. However, if a fitting portion (ring-shaped groove) 31 that fits base portion 41 of window shutter 4 onto the front end of pinion gears is created as shown in FIG. 32 and 33 which show the eleventh embodiment, and if base portion 41 of window shutter 4 fits groove 31 so that relative rotation is possible, window shutter 4 can be advanced and retracted with the advancement and retraction of pinion gears 3. Thus, coil spring 44 can be eliminated. In the above embodiments, a biasing member was inserted between the housing and window shutter base portion to energize and press the window shutter to the pinion side. However, this can be inserted between the shaft snap ring fit onto the output shaft and the window shutter base portion, and the shaft snap ring on be integrated with the fitting ring.

This invention has been described in connection with what are currently considered to be the most practical and preferred embodiments of the present invention. However, this invention is not to be limited to the disclosed embodiments, but rather is meant to include all limitations, alternative embodiments, and equivalent structures included within the spirit and scope of the appended claims.

What is claimed is:

1. A starter for an engine having a ring gear, comprising:

an output shaft for slidably holding a pinion engageable with said ring gear of said engine axially;

a housing having a window portion that rotatably supports one end of said output shaft and enables said pinion to engage with said ring gear when said pinion advances, said housing further having a projection portion that projects to the end of said pinion when said pinion retracts; and a window shutter having a barrier portion that normally covers said window portion, said barrier portion being moved to open said window portion by an advance movement of said pinion toward said ring gear.

2. The starter according to claim 1, wherein said pinion has a flange portion on a side opposite said ring gear, and said flange portion is disposed proximate said projection portion when said pinion engages said ring gear.

3. The starter according to claim 2, further comprising:

said window shutter having a ring portion formed at a side of said ring gear; and biasing means for biasing said ring portion toward said pinon.

4. The started according to claim 3, further comprising:

a wear prevention member disposed between said ring portion and said pinion to prevent wear during relative rotation there between.

5. The starter according to claim 4, further comprising:

a seal means interposed between said ring portion and said pinion

6. The starter according to claim 4, further comprising:

said shutter having a plugging portion at an end thereof to plug through holes on said housing for supporting said output shaft when said pinion is not in operation.

7. The starter according to claim 3, further comprising:

a tubular portion formed on said ring portion of said shutter to cover one end of said biasing means and an outer circumference of an output helical spline.

8. The starter according to claim 7, further comprising:

a cylinder portion formed between said housing and said biasing means, protruding to said tubular portion to cover an outer circumference of the other end of said biasing means, and covering said outer circumference of said biasing means when said pinion is not moved by said tubular portion.

9. A starter having an armature comprising:

a housing including a water barrier wall;

a drive shaft disposed in said housing;

a pinion gear having a flange portion;

wherein said flange portion comes into contact with said barrier wall when said armature is rotated;

wherein said pinion gear is adapted to engage with a ring gear of an engine when said armature is rotated; and wherein said pinion gear contacts said drive shaft through a sliding portion.

10. A starter as claimed in claim 9, further comprising:

a window shutter portion that opens a window of said housing when said pinion gear advances so as to allow said pinion gear to engage with said ring gear.

11. A started as claimed in claim 10, wherein said window shutter portion includes:

a plate-shaped base portion that fits said drive shaft;

a plate-shaped barrier portion for opening and closing said window in said housing; and a bar-shaped guide portion having a coil spring wound thereon.

12. A starter as claimed in claim 10, wherein said window shutter portion is biased to open said window in said housing by said pinion gear when said pinion gear advances by rotation of said armature, the allowing said pinion and ring gears to engage.

13. A starter as claimed in claim 11, wherein said barrier portion moves with said pinion gear, and when said pinion gear retracts, said window in said housing is almost completely covered by said plate-shaped barrier portion.

14. A starter as claimed in claim 11, wherein said plate-shaped barrier portion is one of a partial cylinder and a partial stepped cylinder.

* * * * *